US008625905B2

(12) United States Patent
Schmidt et al.

(10) Patent No.: US 8,625,905 B2
(45) Date of Patent: Jan. 7, 2014

(54) CLASSIFICATION OF TARGET OBJECTS IN MOTION

(75) Inventors: Michael S. Schmidt, Carlisle, MA (US); Prakruti S. Prativadi, Littleton, MA (US); Shane A. Griffin, Danville, NH (US); Ethan J. Phelps, Arlington, MA (US)

(73) Assignee: Raytheon Company, Waltham, MA (US)

( * ) Notice: Subject to any disclaimer, the term of this patent is extended or adjusted under 35 U.S.C. 154(b) by 412 days.

(21) Appl. No.: 13/015,675

(22) Filed: Jan. 28, 2011

(65) Prior Publication Data

US 2012/0195459 A1 Aug. 2, 2012

(51) Int. Cl.
*G06K 9/62* (2006.01)
(52) U.S. Cl.
USPC ........... 382/224; 348/142; 348/143; 382/103; 382/154
(58) Field of Classification Search
USPC ........................... 348/143, 148; 382/103, 154
See application file for complete search history.

(56) References Cited

U.S. PATENT DOCUMENTS

| 5,430,445 | A | 7/1995 | Peregrim |
| 6,720,907 | B1 | 4/2004 | Miron |
| 7,015,855 | B1 | 3/2006 | Medl et al. |
| 7,411,543 | B1 | 8/2008 | Boka et al. |
| 7,684,020 | B1 | 3/2010 | Marti et al. |
| 8,249,301 | B2* | 8/2012 | Brown et al. ................. 382/104 |
| 8,301,344 | B2* | 10/2012 | Simon et al. .................... 701/45 |
| 2002/0140924 | A1* | 10/2002 | Wangler et al. ................. 356/28 |
| 2006/0047704 | A1* | 3/2006 | Gopalakrishnan ......... 707/104.1 |
| 2006/0233436 | A1* | 10/2006 | Ma et al. ....................... 382/154 |
| 2007/0070069 | A1* | 3/2007 | Samarasekera et al. ...... 345/427 |
| 2010/0253597 | A1* | 10/2010 | Seder et al. ....................... 345/7 |
| 2011/0231016 | A1* | 9/2011 | Goulding ...................... 700/246 |
| 2012/0154579 | A1* | 6/2012 | Hampapur et al. ........... 348/143 |
| 2012/0195459 | A1* | 8/2012 | Schmidt et al. ............... 382/103 |

OTHER PUBLICATIONS

Duda, et al., Pattern Classification, 2nd Edition, 2001, John Wiley & Sons, Inc., Chapter 1. Introduction, pp. 1-19.

* cited by examiner

*Primary Examiner* — Gregory M Desire
(74) *Attorney, Agent, or Firm* — Pierce Atwood LLP; Joseph M. Maraia

(57) ABSTRACT

A method for classifying objects in motion that includes providing, to a processor, feature data for one or more classes of objects to be classified, wherein the feature data is indexed by object class, orientation, and sensor. The method also includes providing, to the processor, one or more representative models for characterizing one or more orientation motion profiles for the one or more classes of objects in motion. The method also include acquiring, via a processor, feature data for a target object in motion from multiple sensors and/or for multiple times and trajectory of the target object in motion to classify the target object based on the feature data, the one or more orientation motion profiles and the trajectory of the target object in motion.

15 Claims, 8 Drawing Sheets

CLASSIFICATION OF TARGET OBJECTS IN MOTION

FIELD OF THE INVENTION

The currently described invention relates to systems and methods for classifying objects in motion using more than a single sensor observation either by using multiple sensors, or multiple observations from a single sensor, or both. The currently described invention also relates to data fusion.

BACKGROUND

Prior art methods for classifying target objects in motion (e.g., flight) involve generating training data for the classification systems in an offline mode. The training data, acquired for exemplary objects used for classifying target objects is generated prior to observing the target object to be classified. When fusing data from multiple sensors and multiple observations, the training data consists of joint feature distributions; joint over features to be collected from each sensor and each observation time. One approach attempts to capture the statistical dependencies between multiple observations of exemplary objects with predictable flight dynamics by training over a subset of all possible trajectories and sensor observation times for a fixed set of sensor locations. This method produces a sparse data set since the number of possible trajectories and observation times is infinitely large and the dimensionality of the joint feature space is likewise large and unknown since numbers and times of observation are unknown prior to observation of target object in flight. Therefore, the method does not adequately represent the statistics to successfully classify the target objects. An alternative approach does not attempt to capture the dependencies between multiple observations, but assumes sub-optimally that the observations are independent.

These methods do not adequately classify the target objects. A need therefore exists for improved systems and methods for classifying objects in motion using multiple observations.

SUMMARY

Embodiments described herein relate generally to systems and methods for classifying objects in motion.

One embodiment features a method for classifying objects in motion using multiple observations (e.g., from multiple sensors and/or multiple times). The method includes providing, to a processor, feature data for one or more classes of objects to be classified, wherein the feature data is indexed by object class, orientation, and sensor. The method also includes providing, to the processor, one or more representative models for characterizing one or more orientation motion profiles for the one or more classes of objects in motion. The method also include acquiring, via a processor, feature data for a target object in motion and trajectory of the target object in motion to classify the target object based on the feature data, the one or more orientation motion profiles and the trajectory of the target object in motion.

In some embodiments, providing the one or more representative models for characterizing one or more orientation motion profiles includes acquiring orientation motion data for an exemplary object in motion. In some embodiments, providing the one or more representative models for characterizing one or more orientation motion profiles includes generating orientation motion data based on an analytical model for an exemplary object in motion.

In some embodiments, the method includes acquiring the feature data for the target object in motion and the trajectory of the target object in motion at one or more instances of time, periods of time, or a combination of both. In some embodiments, the method includes acquiring the feature data for the target object in motion and the trajectory of the target object in motion using a plurality of sensors.

In some embodiments, the feature data includes at least one of radar data, optical data or infrared data for each of the one or more classes of objects. The feature data can include radar cross section signals and time derivatives of the radar cross section signals. The sensor can be a radar system, lidar system, optical imaging system, or infrared monitoring system.

In some embodiments, the method includes classifying the target object using Bayes' Rule the target object as belonging to a particular class of the one or more classes of objects based on the posterior probability the target object corresponds to the particular class. In some embodiments, the feature data for the one or more classes of objects and the one or more representative models for characterizing one or more orientation motion profiles for the feature data are indexed in a database stored on the processor.

Another embodiment features a system for classifying objects in motion. The system including data collected prior to classifying a target object in motion, wherein the data includes a) feature data on one or more classes of objects to be classified, wherein the feature data is indexed by orientation, sensor, and object class; and b) one or more representative models for characterizing one or more orientation motion profiles for the feature data on the one or more classes of objects. The system also includes at least one sensor to acquire feature data for a target object in motion and trajectory of the target object in motion. The system also includes a first processor to generate reference feature data while the target object is in motion based on the object class and the trajectory of the target object in motion, wherein the at least one sensor provides feature data and time of feature data. The system also includes a second processor to classify the target object during motion of the target object based on the reference feature data generated by the first processor, and feature data for the target object in motion.

In some embodiments, the system includes one or more sensors to acquire orientation motion data for an exemplary object in motion to generate the one or more orientation motion profiles for the one or more classes of objects.

In some embodiments, the first processor generates reference feature vectors by: 1. selecting an object class, 2. selecting a orientation motion profile for the selected object class, 3. for each point in time that feature data is collected by the at least one sensor for the target object in motion, the selected orientation motion profile and the trajectory of the target object in motion are used to determine the orientation of the target object in motion, a feature is selected from the feature database based on the sensor, object class, and orientation of the target object in motion. In some embodiments, steps 1-3 are repeated to generate a collection of reference feature vectors.

In some embodiments, the second processor is configured to perform Bayesian classification using the reference feature data generated by the first processor as a priori data and the feature data for the target object to be classified to generate posterior object class type probabilities. In some embodiments, the feature data for the target object in motion includes feature data collected from each sensor at single points in time.

Other aspects and advantages of the current invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed descriptions in the accompanying drawings, in which.

DETAILED DESCRIPTION OF ILLUSTRATIVE EMBODIMENTS

Figure 1:
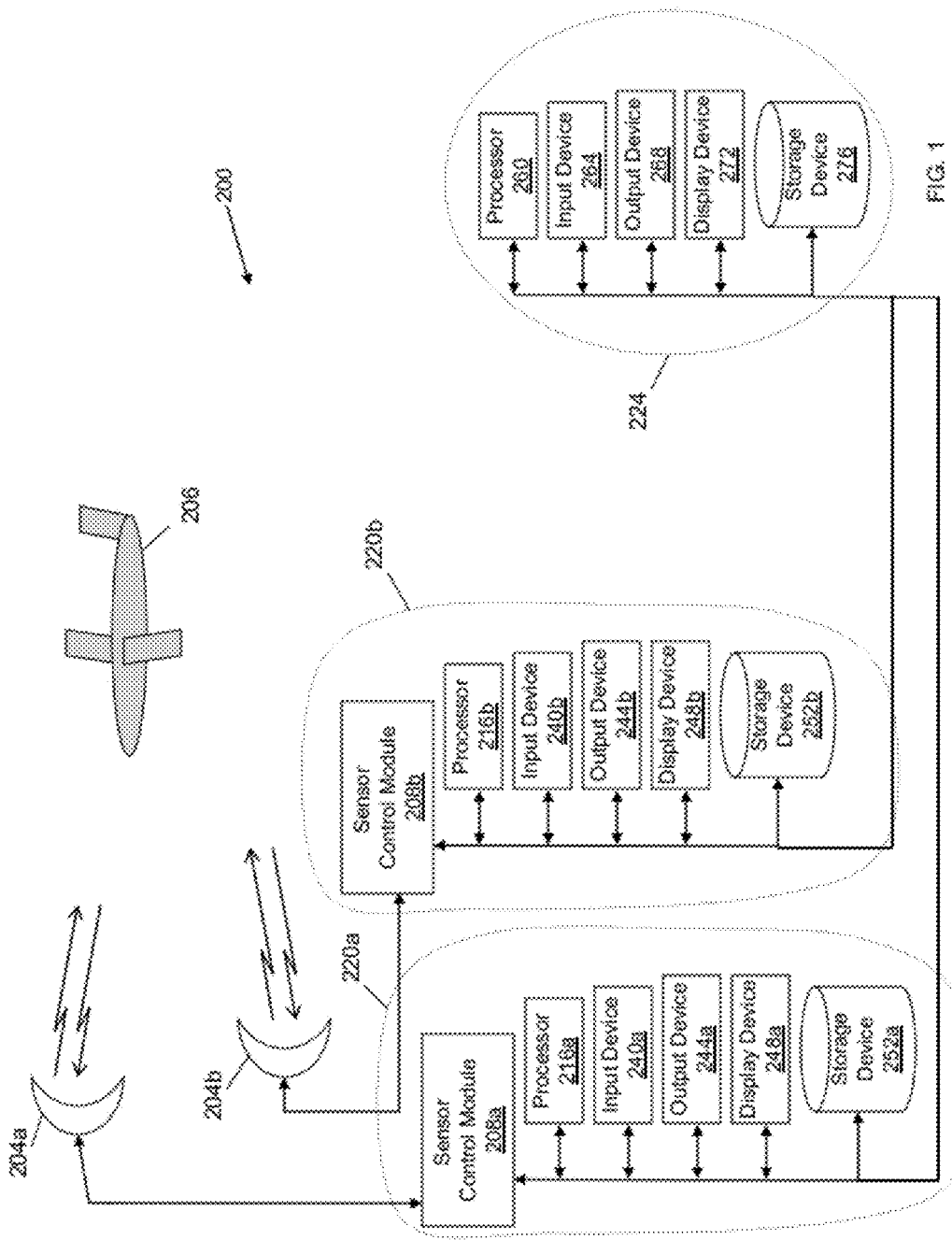
FIG. 1 is a schematic illustration of a system for classifying objects, according to an illustrative embodiment.

FIG. 1 is a schematic illustration of a system 200 for classifying objects, according to an illustrative embodiment. The system 200 includes two sensors 204a and 204b (generally 204) to acquire feature data and motion profile data for an object 206 (e.g., target object) in motion. Each sensor 204 is coupled to a corresponding sensor subsystem 220. Sensor 204a is coupled to sensor subsystem 220a (generally 220) and sensor 204b is coupled to sensor subsystem 220b. Each sensor (204a and 204b) is coupled to a sensor control module (208a and 208b, respectively), processor (216a and 216b, respectively), input device (240a and 240b, respectively), output device (244a and 244b, respectively), display device (248a and 248b, respectively) and a storage device (252a and 252b, respectively).

Processors 216a and 216b provide emission signals to sensor control modules 208a and 208b, respectively, for emission (e.g., radar electromagnetic emissions) by the sensors 204a and 204b. The emitted signals are directed toward the object 206 in motion. Response signals (e.g., radar response signals) reflected back towards the sensors in response to the emitted signals impinging upon the object 206 are received by the sensors 204a and 204b. The sensor control modules 208a and 208b receive the response signals from the sensors 204a and 204b, respectively, and direct the signals to the processor 216a and 216b, respectively. The processors 216a and 216b process the response signals received from each of the sensors to, for example, determine the velocity and radar cross section (RCS) of the object 206. The processors 216a and 216b store various information regarding the system 200 and its operation in the storage devices 252a and 252b, respectively.

The storage devices 252a and 252b can store information and/or any other data associated with the system 200. The storage devices can include a plurality of storage devices. The storage devices can include, for example, long-term storage (e.g., a hard drive, a tape storage device, flash memory, etc.), short-term storage (e.g., a random access memory, a graphics memory, etc.), and/or any other type of computer readable storage.

The modules and devices described herein can, for example, utilize the processors 216a and 216b to execute computer executable instructions and/or include a processor to execute computer executable instructions (e.g., an encryption processing unit, a field programmable gate array processing unit, etc.). It should be understood that the system 200 can include, for example, other modules, devices, and/or processors known in the art and/or varieties of the illustrated modules, devices, and/or processors.

The input devices 240a and 240b receive information associated with the system 200 (e.g., instructions from a user, instructions from another computing device) from a user (not shown) and/or another computing system (not shown). The input devices 240a and 240b can include, for example, a keyboard or a scanner. The output devices 244a and 244b output information associated with the system 200 (e.g., information to a printer (not shown), information to an audio speaker (not shown)).

The display devices 248a and 248b display information associated with the system 200 (e.g., status information, configuration information). The processors 216a and 216b execute the operating system and/or any other computer executable instructions for the system 200 (e.g., processor 216a sends transmission signals to the sensor control module 208a for transmission by the sensor 204a and/or receives response signals from the sensor 204a).

The system 200 also includes a separate processing system 224 that is coupled to sensor subsystem 220a and sensor subsystem 220b. The storage device 276 of the processing system 224 contains feature data and motion profile data on one or more classes of objects (e.g., the feature data and motion profile data for one or more classes of objects previously stored during offline processing steps). In some embodiments, the feature data and motion profile data are previously acquired and stored for one or more exemplary objects. The processing system 224 includes a processor 260 that classifies the target object 206 based, in part, on the previously stored feature data, motion profile data, and data acquired by the sensors 204a and 204b while the target object 206 is in motion.

Alternative types of data may be acquired and used by the system 200 in alternative embodiments. In some embodiments, at least one of radar data (acquired using a radar system as the sensor), optical data (acquired using an optical imaging system as the sensor) and/or infrared data (acquired using an infrared monitoring system as the sensor) is used for one or more classes of objects.

Figure 2A:
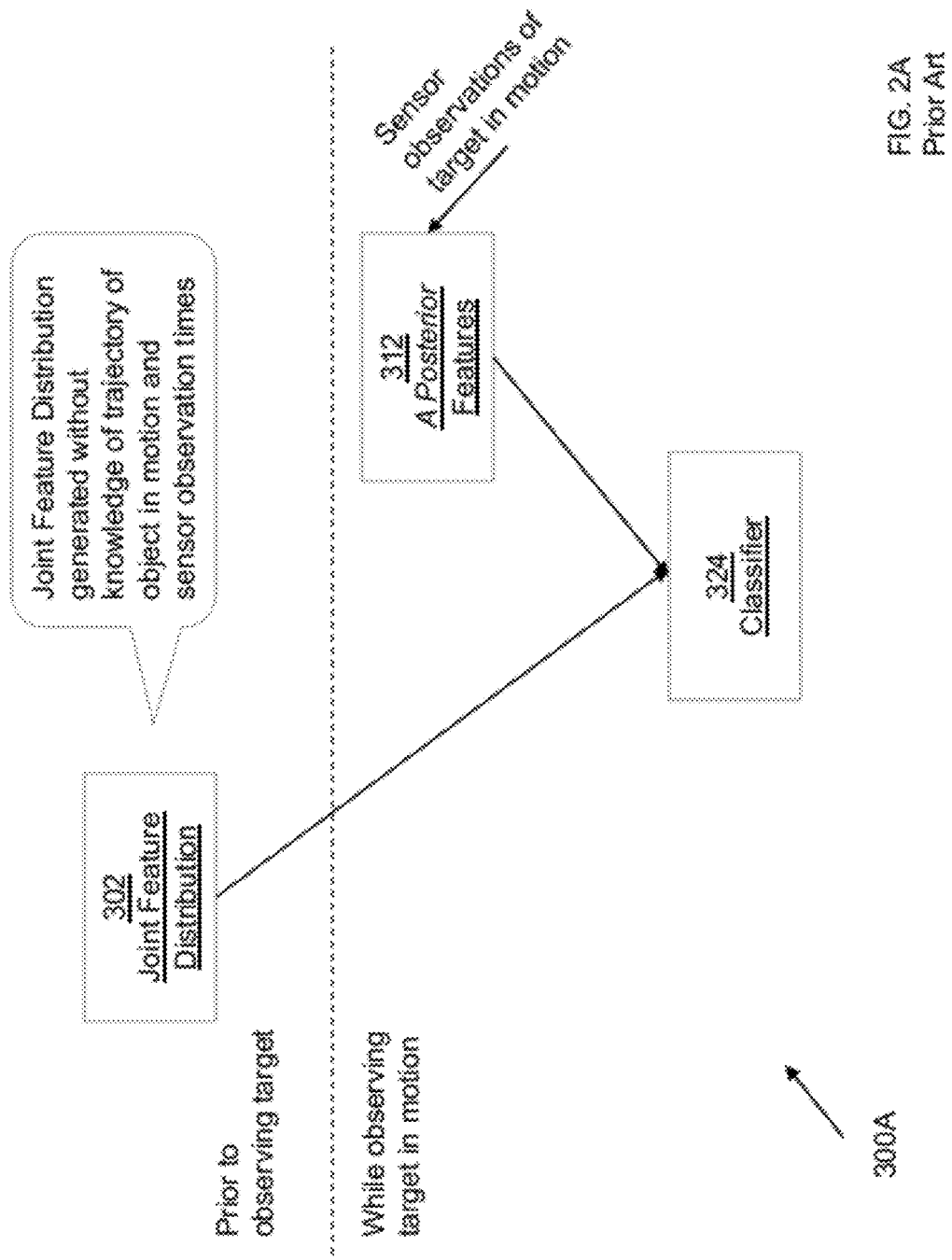
FIG. 2A is a flowchart of a prior art method for classifying objects in motion.

FIG. 2A is s flowchart 300A of a prior art method for classifying target objects in motion. The method includes providing training data (step 302), namely an a priori joint feature distribution, to a processor. Joint feature distributions specify the likelihood of obtaining, via sensing, a set of given object features for an object class. The training data, acquired for exemplary objects used for classifying target objects, is generated prior to observing the target object to be classified. When fusing data from multiple sensors and multiple observations, the training data consists of joint feature distributions; joint over the features to be collected from each sensor and each observation time. In one instance, the classification system attempts to capture the statistical dependencies (the joint feature distribution) between multiple observations of exemplary objects with predictable flight dynamics by collecting feature data via digital simulation over a subset of all possible trajectories and sensor observation times for a fixed set of sensor locations. This method produces a sparse data set since the number of possible trajectories and observation times is infinitely large and the dimensionality of the joint feature space is likewise large and unknown since numbers and times of observation is unknown prior to observation of a target object in flight. This method does not adequately represent the statistics (joint feature distribution) to classify the target objects. An alternative prior art approach does not attempt to capture the dependencies between multiple observations, but assumes sub-optimally that the observations are independent.

The prior art also includes acquiring (step 312), via sensors and processors, feature data for a target object in motion and trajectory of the target object in motion. The feature data and trajectory for the target object in motion can be acquired at, for example, one or more instances of time, one or more sensors, or a combination of both.

The prior art also includes classifying (step 324) the target object based on the feature data. In one instance, classifying (step 324) the target object is performed using a Bayes' classifier in which the target object is specified as belonging to a particular class of one or more classes of objects based on the posterior probability that the target object belongs to the particular class given the a priori joint feature distribution (step 302) and the target object feature data (step 312). Steps 312 and 324 can be performed, for example, using system 200 of FIG. 1.

Figure 2B:
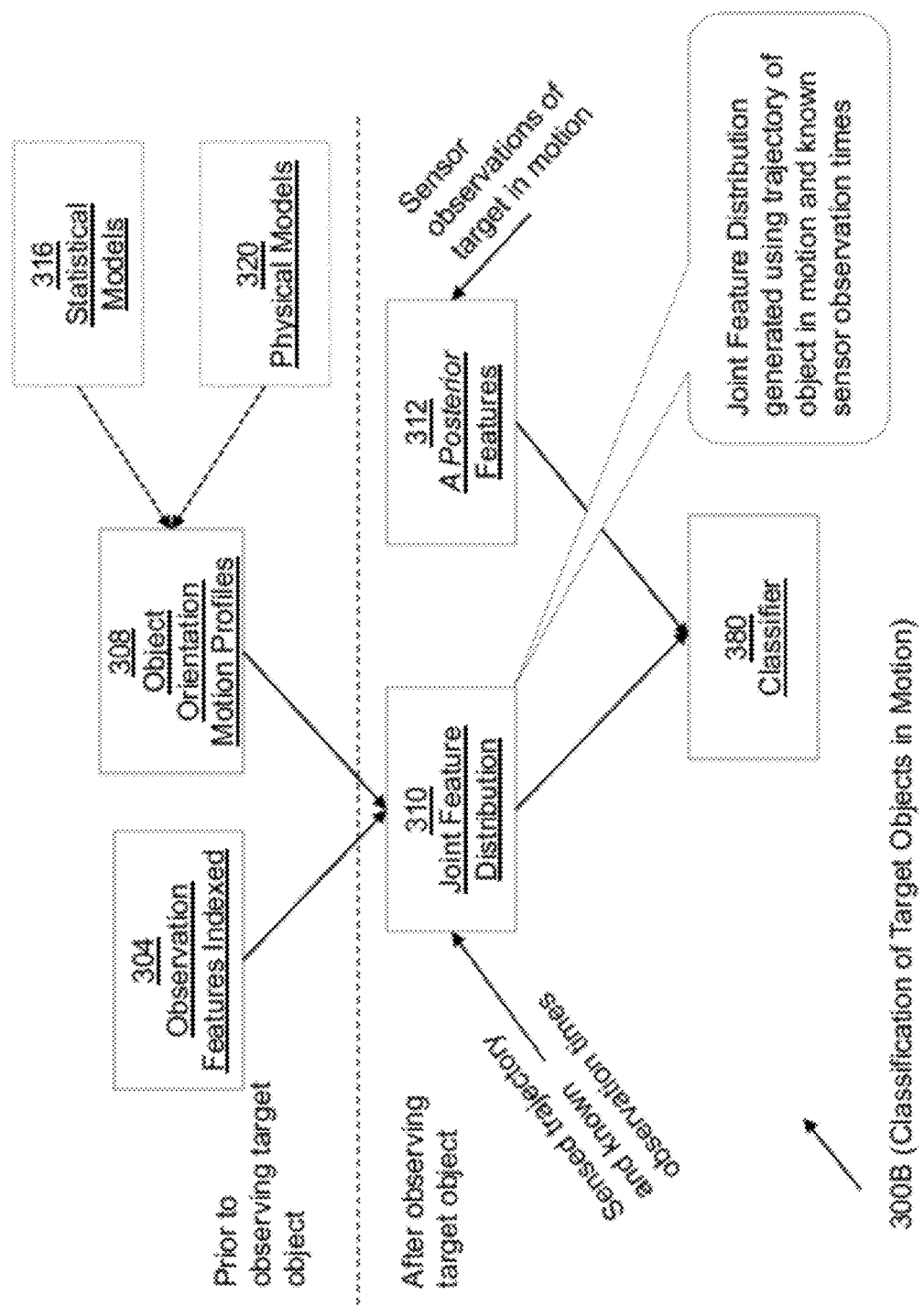
FIG. 2B is a flowchart of a method for classifying objects in motion, according to an illustrative embodiment.

FIG. 2B is s flowchart 300B of a method for classifying target objects in motion, according to an illustrative embodiment. The method includes providing (step 304), to a processor, feature data for one or more exemplary classes of objects to be classified. In one embodiment, the feature data is indexed by object class, orientation and sensor. The feature data can be indexed by, for example, object class, object orientation, sensor, and/or sensor signal-to-noise ratio. Object classes can include, for example, missile, satellite, ground vehicle, aircraft and/or specific model or type of each of these (e.g., Boeing 747 aircraft, F-16 aircraft). The feature data consists of sensor signal data and can include, for example, radar cross section (RCS) signals, and time derivatives of the RCS signals. The data is generated either by using one or more digital simulations of sensors and target models or by collecting the data using one sensor systems and targets. The target objects are not required to be in flight to collect features indexed by aspect angle.

The method also includes providing (step 308), to a processor, one or more representative models for characterizing one or more orientation motion profiles (motion profile data) for the one or more classes of objects in motion. In some embodiments, providing (step 308) the one or more representative models for characterizing one or more orientation motion profiles includes the step of acquiring (step 316) orientation motion data for an exemplary object in motion by digital simulation (e.g., the models are statistical models). In an alternative embodiment, providing (step 308) the one or more representative models for characterizing one or more orientation motion profiles includes the optional step of generating (step 320) orientation motion data based on an analytical model for an exemplary object in motion (e.g., the models are physical models). In some embodiments, a combination of statistical models and physical models are used.

In some embodiments, the representative models characterizing a motion profile for a class of objects is generated based on an analytical model of an exemplary object in motion. In one embodiment, an analytical model of an exemplary object in motion is a kinematic model describing the motion of the exemplary object along a curvilinear path in which each point along the path defines the location and velocity vector of the exemplary object. For example, a motion model might consist of a ballistic model for propagation of position and velocity and a statistical distribution for the angular momentum vector relative to the velocity vector, and a statistical distribution for the precession phase. Examples of ballistic motion models include $4^{th}$ order Runge-Kutta integration of differential equations that represent gravity, Coriolis and centrifugal forces and the Simplified General Perturbation 4 (SGP4) algorithm.

The feature and motion profile data (steps 304 and 308) are stored in, for example, a database for subsequent use by a real time training method (e.g., stored by processor 260 in storage device 276 of FIG. 1).

The method also includes generating a representative feature database specific to the observed trajectory of the target object to be classified and the sensor observation times of the target object to be classified (step 310). The representative feature database is generated by sampling from the motion profiles of step 308, using them to determine the orientation of the object to be classified at each sensor collection and selecting the feature with that orientation, class and SNR from feature data from step 304. In one embodiment, a first processor generates the reference data (e.g., reference feature vectors) by: 1. selecting an object class, 2. selecting a orientation motion profile for the selected object class, 3. for each point in time that feature data is collected by the at least one sensor for the target object in motion, the selected orientation motion profile and the trajectory of the target object in motion are used to determine the orientation of the target object in motion, a feature is selected from the feature database based on the sensor, object class, and orientation of the target object in motion. In this way a classification database (namely the joint feature distribution which captures statistical dependencies) is constructed in near-real time specific to the trajectory of the object to be classified and the times and locations of the sensor observations.

Similar as with the prior art method, the method of FIG. 2B also includes acquiring (step 312), via a processor, feature data for a target object in motion and trajectory of the target object in motion. The feature data and trajectory for the target object in motion can be acquired at, for example, one or more instances of time, periods of time, or a combination of both. The feature data and trajectory for the target object in motion can be acquired using one or a plurality of sensors.

Referring to FIG. 2B, the method depicted by flowchart 300B includes classifying (step 380) the target object based on the joint feature distribution (generated in step 310) and the a posterior feature data (acquired in step 312). The joint feature distribution (of step 310) is based on the feature data, the one or more orientation motion profiles and the feature data and trajectory of the target object in motion. In one embodiment, classifying (step 380) the target object is performed using Bayes' Rule in which the target object is specified as belonging to a particular class of one or more classes of objects based on the posterior probability the target object belongs to the particular class. Steps 310, 312 and 324 can be performed, for example, using system 200 of FIG. 1.

By way of illustration, a simulation was conducted to classify a target object using the system 200 of FIG. 1 and the method of FIG. 2B in which there are two object classes (triangle and rectangle). Referring to FIG. 3D, there are two sensors, sensor 420a and sensor 420b (e.g., sensors 204a and 204b of FIG. 1) for measuring data associated with the objects in motion.

Figure 3A:
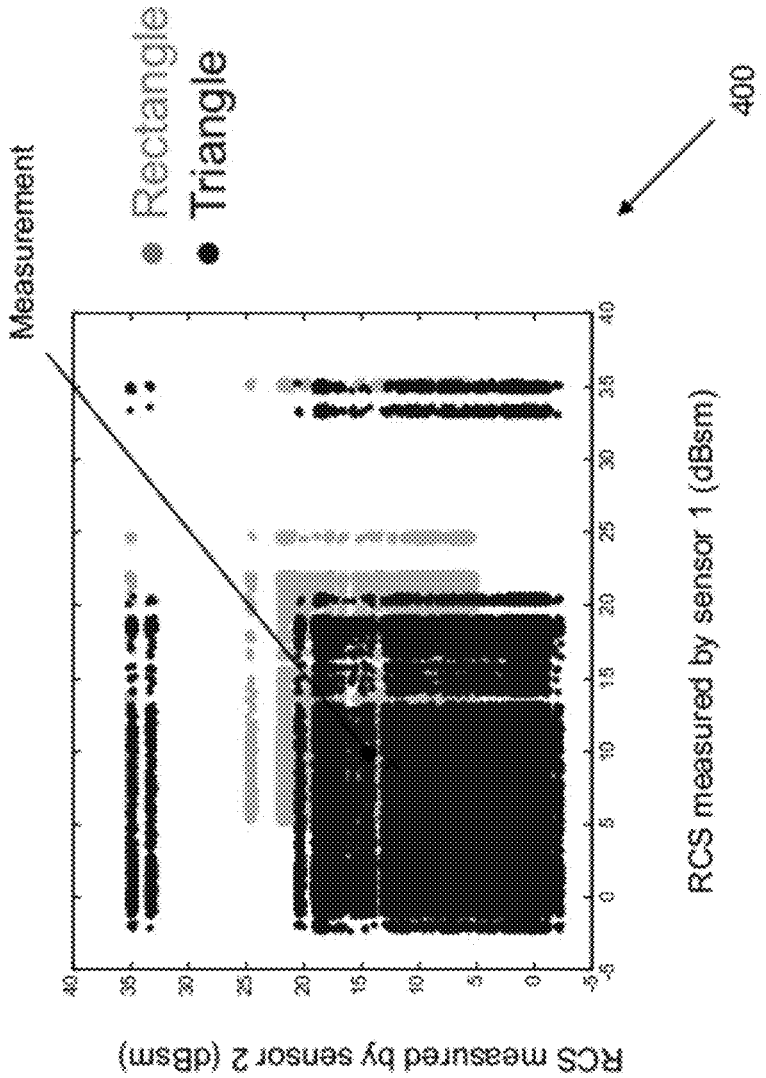
FIG. 3A is a graphical representation of radar cross section measured by a first sensor versus radar cross section measured by a second sensor.
Figure 3B:
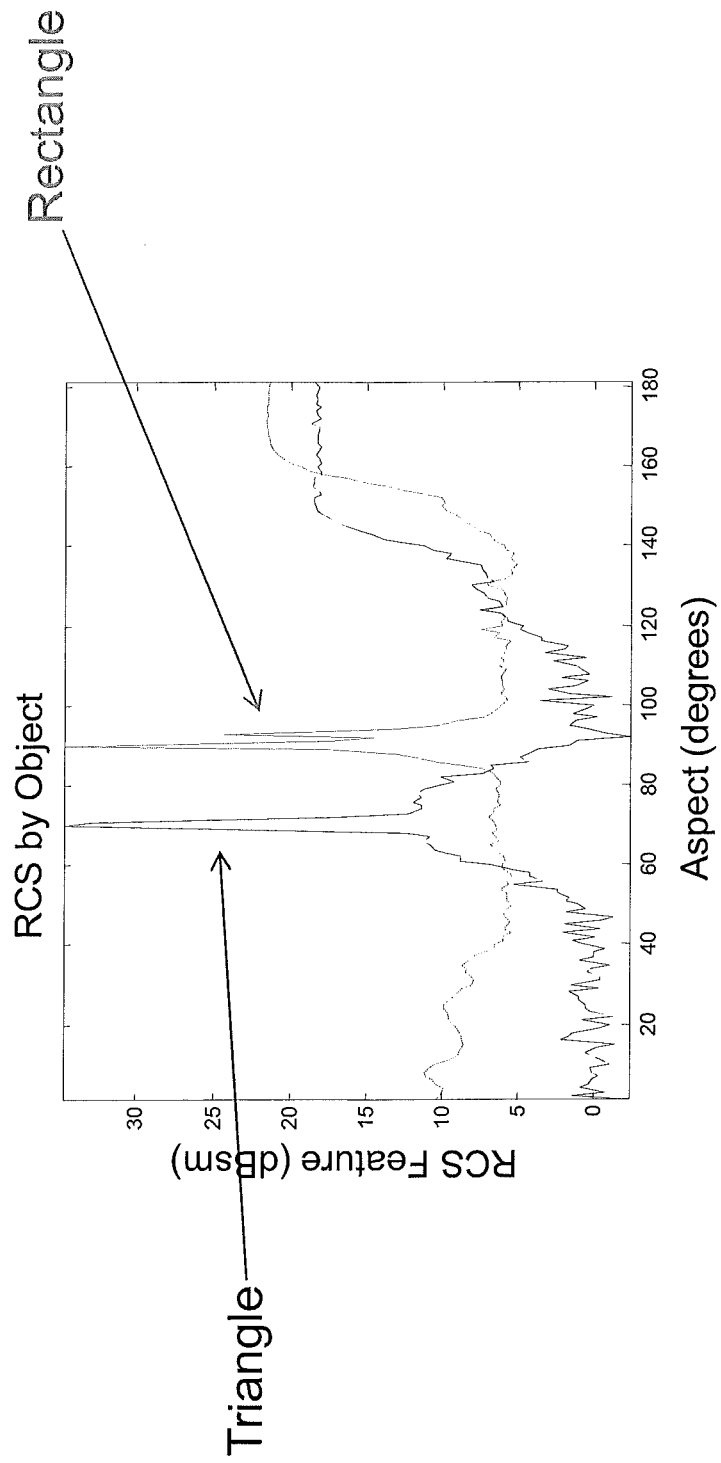
FIG. 3B is a graphical representation of radar cross section versus aspect angle for two classes of objects, using a method in one embodiment for a target object to be classified.
Figure 3C:
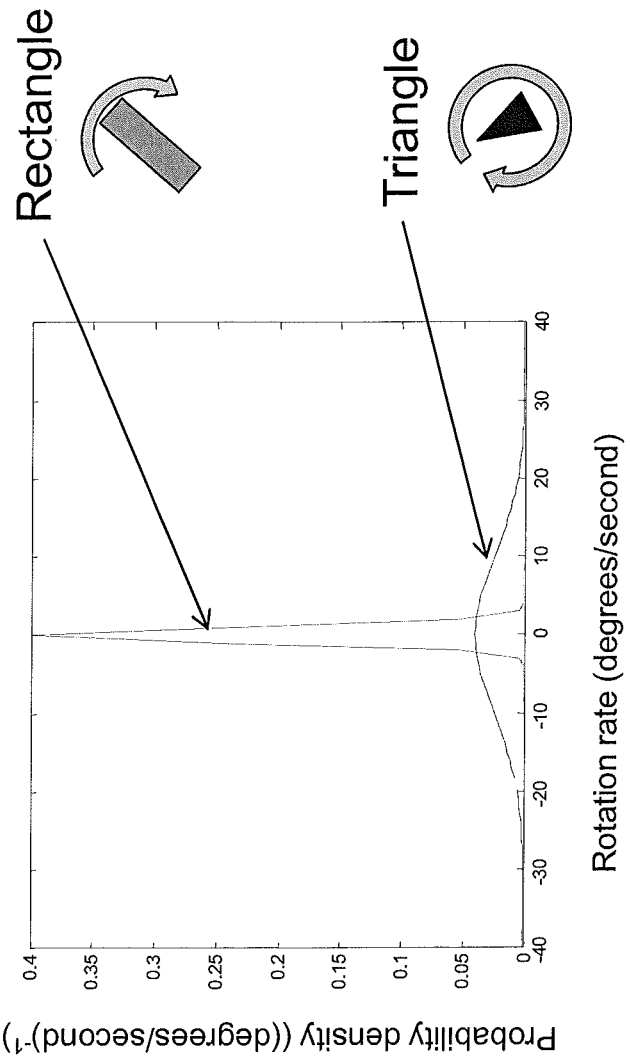
FIG. 3C is a graphical representation of rotation rate versus probability density for the two classes of objects of FIG. 3B, using a method in one embodiment for a target object to be classified.
Figure 3D:
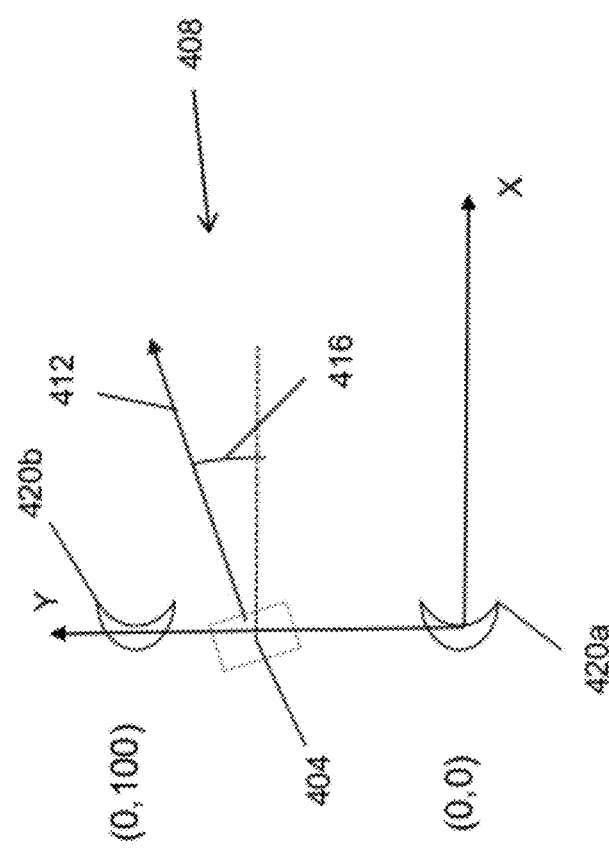
FIG. 3D is a graphical representation of simulated measurements for a target object in motion.

FIG. 3A illustrates the results using the prior art method of FIG. 2A and is a graphical representation of the joint feature distribution of radar cross section (RCS) of the two object classes (triangle and rectangle) measured by a first sensor (sensor 1 is sensor 420a of FIG. 3D) versus radar cross section (RCS) measured by a second sensor (sensor 2 is sensor 420b of FIG. 3D). The method of FIG. 2A assumes sub-optimally that the observations are independent (step 302). The system implementing the method of FIG. 2A measures a value of 9 dBsm (decibel measure of the radar cross section of a target relative to one square meter) using the first sensor and a value of 15 dBsm using the second sensor for a target object (step 312), and is unable to effectively classify the target object (step 324). The system is unable to determine whether the target object is a rectangle or a triangle because the possible feature values (RCS values) for the two object classes (rectangle and triangle) overlap (as shown in the plot in FIG. 3A).

Feature data and motion profile data was generated for the two classes of objects. FIG. 3B is a graphical representation of radar cross section versus aspect angle for the two classes of objects. The data in FIG. 3B is used as the feature data for the simulation (step 304 of FIG. 2B). FIG. 3C is a graphical representation of rotation rate versus probability density for the two classes of objects of FIG. 3B. The data in FIG. 3C is used as the motion profile data for the two classes of objects (e.g., step 308 of FIG. 2B). In this embodiment, the triangle class of objects is capable of spinning at a faster rate than the rectangular class of objects.

FIG. 3D is a graphical representation of simulated measurements for a target object 404 in motion. The target object 404 has an initial position on the Y-axis of the plot 408 at (0,53). The trajectory 412 of the target object 404 is at an angle 416 of seventeen (17) degrees. The speed of the target object 404 along the trajectory 412 is four (4) km/s. Sensor 420a observes (i.e., takes a measurement) at a time of two (2) seconds and sensor 420b observes at a time of five (5) seconds. Sensor 420a has a signal-to-noise ratio of eight (9) dB and sensor 420b has a signal-to-noise ratio of twelve (15) dB.

Figure 3E:
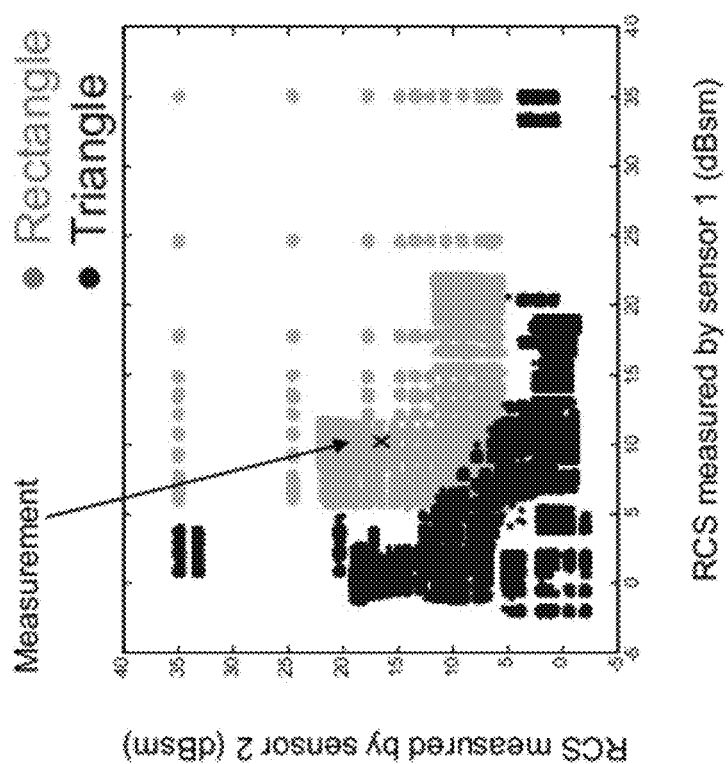
FIG. 3E is a graphical representation identifying the classification of a target object based on the feature data and motion profile data of FIGS. 3B and 3C and measurements for a target object in motion, using a method to classify the target object.

The feature data and motion profile data of FIGS. 3B and 3C were then used as the basis for classifying the target object 404. FIG. 3E illustrates the results of step 310 of FIG. 2B. FIG. 3E illustrates a new feature database (different from the prior art illustrated by the result in FIG. 3A) which is constructed after the target object in flight to be classified is observed. The method of the embodiment repeatedly randomly selects an initial assumption for the target object (triangle or rectangle), initial assumption for the trajectory angle (−90 to 90 degrees) for the target object, and initial assumption of the object motion profile of the target object rotating at a rate in accordance with the exemplary rotation rates (degrees/second) of FIG. 3C. In this manner, the lightly shaded and darkly shaded points (joint feature distribution) in FIG. 3E are generated based on orientation of the object at the time of sensor measurements and FIG. 3B.

Now, a system employing the inventive methods described herein that measures a value of 9 dBsm (decibel measure of the radar cross section of a target relative to one square meter) using the first sensor and a value of 15 dBsm using the second sensor for a target object is able to effectively classify the target object as a rectangle (step 380 FIG. 3B).

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method for classifying objects in motion, comprising:
providing, to one or more processors, feature data for one or more classes of objects to be classified, wherein the feature data is indexed by object class, orientation, and sensor;
providing, to the one or more processors, one or more representative models for characterizing one or more orientation motion profiles for the one or more classes of objects in motion;
acquiring, via the one or more processors, feature data for a target object in motion, time of feature data, and trajectory of the target object in motion;
generating, via the one or more processors, reference feature data while the target object is in motion based on the acquired object class and trajectory of the target object in motion by:
selecting an object class;
selecting an orientation motion profile for the selected object class;
for each point in time that feature data is collected by the at least one sensor for the target object in motion, the selected orientation motion profile and the trajectory of the target object in motion are used to determine the orientation of the target object in motion, a feature is selected from the feature database based on the sensor, object class, and orientation of the target object in motion;
classifying, via the one or more processors, the target object during motion of the target object based on the generated reference feature data and the acquired feature data for the target object in motion.

2. The method of claim 1, wherein providing the one or more representative models for characterizing one or more orientation motion profiles comprises acquiring orientation motion data for an exemplary object in motion.

3. The method of claim 1, wherein providing the one or more representative models for characterizing one or more orientation motion profiles comprises generating orientation motion data based on an analytical model for an exemplary object in motion.

4. The method of claim 1, comprising acquiring the feature data for the target object in motion and the trajectory of the target object in motion at one or more instances of time, periods of time, or a combination of both.

5. The method of claim 1, comprising acquiring the feature data for the target object in motion and the trajectory of the target object in motion using a plurality of sensors.

6. The method of claim 1, wherein the feature data comprises at least one of radar data, optical data or infrared data for each of the one or more classes of objects.

7. The method of claim 6, wherein the feature data comprises radar cross section signals and time derivatives of the radar cross section signals.

8. The method of claim 6, wherein the sensor is selected from the group consisting of a radar system, lidar system, optical imaging system, or infrared monitoring system.

9. The method of claim 1, comprising classifying the target object using Bayes' Rule the target object as belonging to a particular class of the one or more classes of objects based on the posterior probability the target object corresponds to the particular class.

10. The method of claim 1, wherein the feature data for the one or more classes of objects and the one or more representative models for characterizing one or more orientation motion profiles for the feature data are indexed in a database stored on the processor.

11. A system for classifying objects in motion, comprising:
data collected prior to classifying a target object in motion, the data comprising:
a) feature data on one or more classes of objects to be classified, wherein the feature data is indexed by orientation, sensor, and object class; and b) one or more representative models for characterizing one or more orientation motion profiles for the feature data on the one or more classes of objects;

at least one sensor to acquire feature data for a target object in motion and trajectory of the target object in motion;

a first processor to generate reference feature data while the target object is in motion based on the object class and the trajectory of the target object in motion, wherein the at least one sensor provides feature data and time of feature data;

a second processor to classify the target object during motion of the target object based on the reference feature data generated by the first processor, and feature data for the target object in motion;

wherein the first processor generates reference feature data by:
1. selecting an object class,
2. selecting an orientation motion profile for the selected object class,
3. for each point in time that feature data is collected by the at least one sensor for the target object in motion, the selected orientation motion profile and the trajectory of the target object in motion are used to determine the orientation of the target object in motion, a feature is selected from the feature database based on the sensor, object class, and orientation of the target object in motion.

12. The system of claim 11, comprising one or more sensors to acquire orientation motion data for an exemplary object in motion to generate the one or more orientation motion profiles for the one or more classes of objects.

13. The system of claim 11, wherein steps 1-3 are repeated to generate a collection of reference feature vectors.

14. The system of claim 11, wherein the second processor performs Bayesian classification using the reference feature data generated by the first processor as a priori data and the feature data for the target object to be classified to generate posterior object class type probabilities.

15. The method of claim 14, wherein the feature data for the target object in motion comprises feature data collected from each sensor at single points in time.

* * * * *